Figure 1:
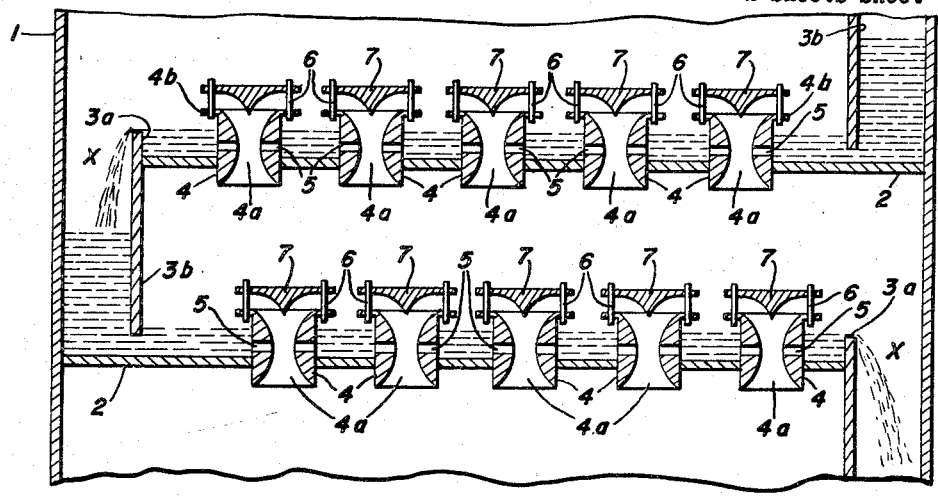

Sept. 19, 1950        J. D. LONG        2,523,126
APPARATUS FOR COUNTERCURRENT CONTACT OF FLUID MATERIALS
Filed Nov. 20, 1947        2 Sheets-Sheet 1

INVENTOR
JOHN D. LONG
BY W. D. T. Heilman
ATTORNEY

Sept. 19, 1950           J. D. LONG           2,523,126

APPARATUS FOR COUNTERCURRENT CONTACT OF FLUID MATERIALS

Filed Nov. 20, 1947           2 Sheets-Sheet 2

INVENTOR
JOHN D. LONG.
BY W. O. Heilman
ATTORNEY

Patented Sept. 19, 1950

2,523,126

UNITED STATES PATENT OFFICE 2,523,126

APPARATUS FOR COUNTERCURRENT CONTACT OF FLUID MATERIALS

John D. Long, Caracas, Venezuela, assignor to Standard Oil Development Company, a corporation of Delaware Application November 20, 1947, Serial No. 787,124

1 Claim. (Cl. 261—114)

The present invention relates to a means for contacting fluids of substantially dissimilar specific gravity or character in countercurrent flow. More particularly, it relates to such a method as practiced in countercurrent contact of liquids and vapors as in a fractionation or distillation tower, and by the use of Venturi type means for the replacement of bubble cap elements in the plates or trays of such contacting means. In such operations it is an object of the invention to improve contacting efficiency by dispersing the heavier fluid in the lighter in contradistinction to present methods, and particularly by dispersing the liquid in the gaseous medium when operating a fractionating or distillation tower. It is also an object to provide an apparatus for effecting countercurrent liquid to liquid contact by such Venturi means.

At the present time, in the fractionation of a heated gaseous medium, it is customary to pass the gaseous material upward through an elongated vertical column or tower provided with a plurality of horizontally disposed, perforated plates or trays, while flowing a body of a liquid medium downwardly over such trays at a predetermined rate and depth. The openings in each tray are provided with chimney portions and covered by caps, known as bubble caps, supported by said chimney portions, which force dispersion of the gas through the liquid flowing across the trays and maintained at a specified level thereon. Usually the liquid stream is directed in such manner as to create a side to side flow from one plate to another downwardly through the column.

This type of equipment has been used for many years, and by gradual improvement of design, considerable improvements in efficiency have been obtained. It has been found, however, that more efficient contact between vapors or gases and liquid is obtained by dispersion of a liquid in a vapor or gas, than by dispersion of a gas or vapor in a liquid as accomplished by the use of bubble-caps. To obtain the benefits of liquid in gas dispersion, the present invention provides means for dispersing a plate liquid in a stream of gas flowing through openings in a fractionating tower plate or tray provided with Venturi vents instead of bubble caps. Likewise, countercurrent liquid extraction processes utilize similar apparatus, and many of the benefits of the present invention may be obtained by employment of the present invention in the manner herein set forth.

Figure 2:
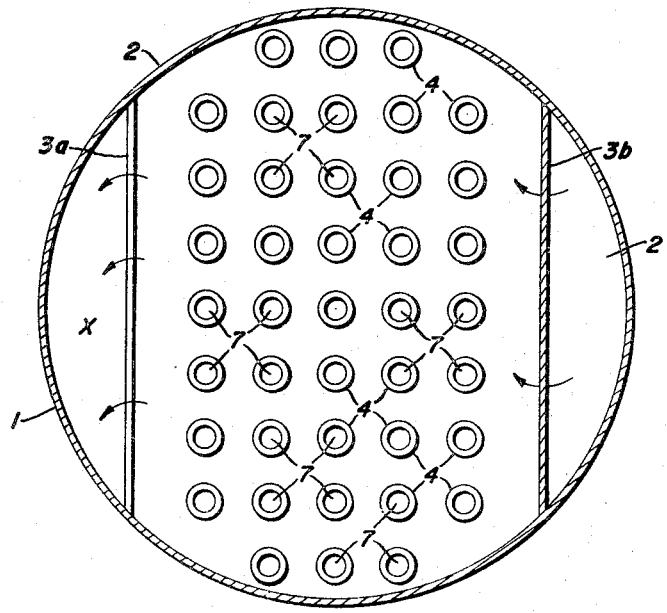

The invention and its objects may be readily understood from the following description when read in conjunction with the accompanying drawings in which Fig. 1 is a diagrammatic showing of a vertical section through a portion of a countercurrent contacting apparatus, Fig. 2 is a plan view of a tray or plate in such apparatus.

Figure 4:
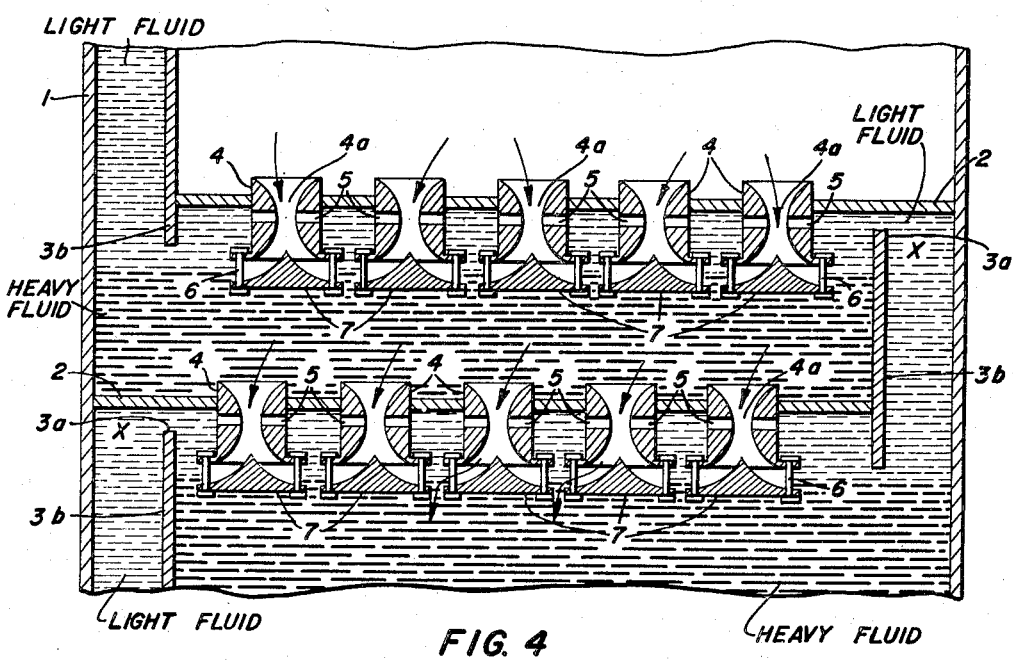
Figure 3:
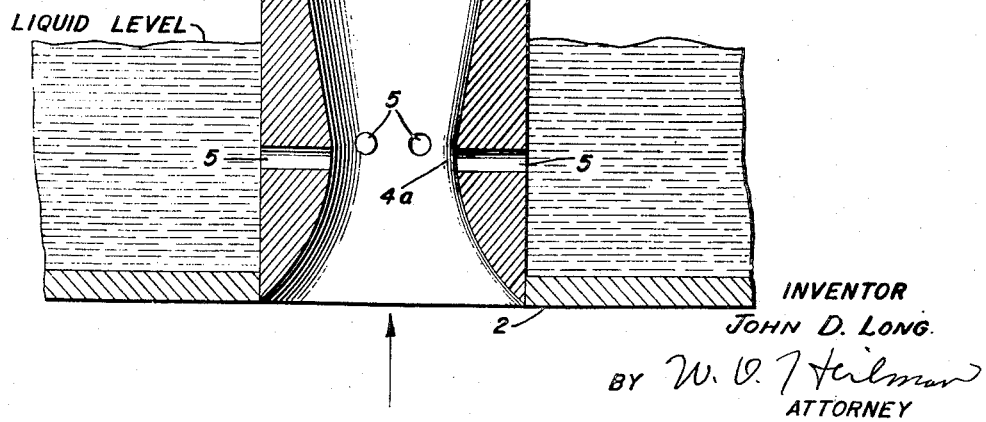

Fig. 3 is an enlarged view in vertical section of the contacting means according to this invention, and Fig. 4 is a showing similar to that of Fig. 1 of another form of contacting apparatus.

Referring more specifically to the drawing, in which similar parts are similarly identified, the numeral 1 designates a fractionation tower or other apparatus of like nature intended for countercurrent contacting of fluids of dissimilar specific gravities. Within the tower, a vertical series of contact zones is provided by means of a vertical series of plates or trays 2 which are fitted in fluid tight relation to the tower walls, except that a segment of each plate has been removed to provide an opening or passageway from plate to plate, as at X. In locating the plates in the tower, it is preferred that the openings be oppositely disposed so that, in a fluid flowing through the tower by way of such passageways, lateral flow from plate to plate will be induced. Means are provided to maintain a predetermined interface level between the fluid phases passing through the tower, such as a weir-baffle member, at the plate edge of each opening $x$, consisting of a weir portion 3a and a baffle portion 3b. Where the lighter of two fluids is to be the dispersing medium for the heavier fluid, as where a liquid is to be dispersed in a vapor for contact in a fractionating operation, the weir and baffle elements are disposed as shown in Fig. 1, but where, as in a solvent extraction process, it may be desired to disperse the lighter of two fluids, such as an oil, in the heavier, such as phenol, the weir-baffle is disposed as shown in Fig. 4.

Dispersion of the one fluid in the other is accomplished mechanically under the influence of gravimetric pressures, by means of Venturi elements 4 communicating with suitable perforations in the plates 2. When dispersing the heavier fluid in the lighter, these elements 4 are disposed over the perforations as shown in Fig. 1. When dispersing the lighter fluid in the heavier, they are disposed below the perforations as shown in Fig. 4. It is preferred that the Venturi elements 4 be of such length, and that the weir and baffle portions 3a and 3b be so adjusted, as to permit the discharge ends of the elements 4 to open into a body of the dispersing fluid maintained in each contact zone by the baffle portions 3*b*. A body of the fluid to be dispersed is maintained in smaller volume around the Venturi elements 4, and preferably not beyond the outlet thereof, by means of the weir portions 3*a*. Each of the Venturi elements 4 is provided with a plurality of passageways or inspirating tubes 5 opening radially outward from the throat 4*a* of the element 4 through the sidewalls thereof, and into communication with the space to be occupied by the fluid to be dispersed, the outer end of the tube 5 normally being submerged therein.

When operating, as illustrated by Fig. 1, with a vapor and a liquid, the elements 4 are preferably provided with deflectors 7 to prevent straight-through flow of the vapors, or the liquid-vapor dispersion, from plate to plate. These deflectors are preferably of substantially conical shape and are mounted on spacer rods 6 secured to a flange 4*b* on the discharge end of the elements 4, in such manner that the apex of the deflector member extends into or toward the outlet of the element. As an additional precaution, it is also desirable that the elements 4 be so disposed on each plate as to avoid alignment of such elements on one plate with those on the plate above or below. Further, while the distribution of elements 4 over the total area of the plate may not be essentially critical, it is preferred that they be arranged so as to provide a minimum of interference with the flow across the plate of fluid to be dispersed. To this end it is preferred that the elements be disposed in uniform rows, i. e. that they have a square pitch, rather than in alternate rows, i. e. having a triangular pitch. In such fashion the plate liquid gradient is reduced, and improved separation of phases is achieved, both of which are desirable in the use of elements of the character described. It is also considered desirable that the Venturi elements be spaced, one from another, by a distance not less than two element diameters.

In determining suitable dimensions for the Venturi elements 4, the same general dimensional relationships are required as for any Venturi device. In particular, it is considered that the diameter of the Venturi inlet may be taken as the controlling dimension, and in the service it is contemplated that inlet diameters of from one inch to four inches will be found most economical and practical. The length of the elements should be not substantially less than twice the inlet diameter, with the Venturi throat located at a distance from the inlet equal to approximately ¼ the total length of the element, the throat diameter being from about ¼ to ½ the inlet diameter.

The inspirating tubes 5 should open outwardly through the element 4 at the narrowest part of the throat, being arranged circumferentially thereof. It is considered desirable that the diameter of these tubes 5 be not less than 1/16 inch, to avoid plugging, and not more than ¼ the diameter of the throat 4*a*, and that these tubes shall be spaced not closer than twice the diameter of the tubes employed.

Having such dimensions in mind, and assuming the use of a Venturi element having an inlet diameter of two inches, the following conforming dimensions would be evident:

| | |
|---|---|
| Venturi inlet diameter | 2 inches |
| Element length | 4 inches minimum |
| Distance from inlet to throat | 1 inch |
| Diameter of throat | ½ to 1 inch |
| Diameter of inspirating tubes | 1/16 inch minimum; ¼ inch maximum |
| Spacing of inspirating tubes | ⅛ to ½ inch |

A fractionating tower according to the invention will operate in conventional fashion to the extent that a liquid medium, introduced at the top, will be permitted to flow downwardly through the tower over the successive plates in succession, while a gaseous medium, introduced at the bottom, is passed upwardly through the respective plates to contact the liquid flowing down. However, whereas in the conventional tower, the gaseous medium is dispersed in the liquid by the use of bubble cap elements, according to this invention the liquid is dispersed in the gas by means of the special Venturi elements, or jets illustrated and described. By virtue of the invention, lower liquid levels and volumes may be maintained on the respective plates, it being necessary merely to maintain a level sufficient to cover the comparatively small inspirating tubes, and in such operation the effect of vapor flow on the liquid gradient across the plates is substantially eliminated.

Although the invention has been described primarily with reference to an operation in which the heavier fluid is dispersed in the lighter fluid flowing upwardly through the tower 1, and particularly a liquid dispersed in and by a vapor, not only may such an operation be performed with two liquids of dissimilar gravity, but also by modification of the apparatus as shown in Figure 4, the heavier liquid may be suitably utilized to accomplish similar liquid to liquid contact by dispersal of a lighter liquid. As may be noted from the drawings, the dispersing fluid is preferably the one supplied to the tower and maintained therein in greater volume than the one to be dispersed, although other factors may frequently determine volume, rate of flow, and manipulation of the respective phases. In any event, while the invention has been described with reference to specific utilization thereof, it is not intended that it shall be limited by such description, provided for the purpose of illustration, but only by the appended claim.

I claim:

In an apparatus for countercurrent contact of fluids of dissimilar gravity, including a tower vessel, a plurality of plate elements transversely of said vessel and forming therewith a vertical series of confined contact zones for said fluids in which they are maintained as substantially separate phases having an interface, and means for flowing a stream of one fluid laterally through said zone, a means for flowing another fluid substantially vertically through said zones, comprising substantially tubular conduit elements opening through each plate, said elements having inlet and outlet ends and extending from one zone into another communicating in each of said zones with the fluid phase flowing vertically through the tower, the outlet end of each element terminating beyond the interface between phases, a Venturi throat in each element and a plurality of inspirating tubes opening radially outwardly from said throat through said element into said phase flowing laterally through the contact zones, whereby the fluid flowing through said element inspirates the other fluid into the element through said tubes, an annular flange portion at the outer end of said element, a plurality of vertical studs extending outwardly from said flange, and a substantially conical deflector element, having an annular base rim flange, engageable by said studs, and supported thereby in spaced relation to the flanged end of said tubular element with the apex end of said conical deflector extending toward the Venturi element, concentrically thereof.

JOHN D. LONG.

REFERENCES CITED

The following references are of record in the file of this patent:

UNITED STATES PATENTS

| Number | Name | Date |
|---|---|---|
| 1,613,352 | Kobernik | Jan. 4, 1927 |
| 1,741,519 | Huff | Dec. 31, 1929 |
| 1,918,005 | Urquhart | July 11, 1933 |
| 2,183,561 | Hamblin | Dec. 19, 1939 |
| 2,222,565 | Kraft | Nov. 19, 1940 |
| 2,327,993 | Bragg | Aug. 31, 1943 |
| 2,345,667 | Hachmuth | Apr. 4, 1944 |